//350-427
OR  4,080,047

United States Patent [19]
Uesugi et al.

[11] 4,080,047
[45] * Mar. 21, 1978

[54] LENS SYSTEM CAPABLE OF WIDE RANGE ZOOMING AND MACROPHOTOGRAPHY

[75] Inventors: Kyozo Uesugi, Izumi; Mitsuo Yasukuni, Sakai, both of Japan

[73] Assignee: Minolta Camera Kabushiki Kaisha, Osaka, Japan

[*] Notice: The portion of the term of this patent subsequent to Nov. 30, 1993, has been disclaimed.

[21] Appl. No.: 680,907

[22] Filed: Apr. 28, 1976

Related U.S. Application Data

[63] Continuation-in-part of Ser. No. 564,817, Apr. 3, 1975, Pat. No. 3,994,572.

[30] Foreign Application Priority Data

May 15, 1975   Japan .................................. 50-58065

[51] Int. Cl.² ............................................... G02B 15/18
[52] U.S. Cl. .................................... 350/184; 350/186
[58] Field of Search ................................ 350/184, 186

[56] References Cited

U.S. PATENT DOCUMENTS

| | | | |
|---|---|---|---|
| 3,912,373 | 10/1975 | Macher | 350/184 |
| 3,994,572 | 11/1976 | Uesugi et al. | 350/186 |

*Primary Examiner*—Conrad J. Clark
*Attorney, Agent, or Firm*—Harold L. Jackson; Stanley R. Jones; Joseph W. Price

[57] ABSTRACT

The present lens system is capable of providing not only a zooming function over a relatively wide range, but also macrophotography. The zoom lens system includes a first lens group capable of varying the focal length without a loss of focus and a second lens group forming a master lens group. The second lens group is spatially displaced on the image side of the first lens group and includes a lens component movably mounted on the optical axis of the system that is capable of varying the focal length of the second lens group. The movable lens component in the second lens group has two positions which will provide the same final image plane for the entire zoom lens system, for example, a forward and backward position does not introduce any image plane deviations and permits an extension of the zoom range of the total lens system. The intermediate position of the movable lens component of the second lens group can be utilized for focusing in a macrophotography range. Thus the movable lens component has the capability of providing an exaggerated image plane deviation between its forward and backward position to permit macrophotography with the lens system.

13 Claims, 25 Drawing Figures

F = 20.406
Fno = 2.82

Spherical aberration
Sine condition

Astigmatism

Distortion

Lateral chromatic aberration

Fig.10-B

Spherical aberration
Sine condition

Astigmatism

Distortion

Lateral chromatic aberration

Spherical aberration
Sine condition

Astigmatism

Distortion

Lateral chromatic aberration

LENS SYSTEM CAPABLE OF WIDE RANGE ZOOMING AND MACROPHOTOGRAPHY

BACKGROUND OF THE INVENTION

Related Applications

The present application is a continuation-in-part application of Ser. No. 564,817 filed Apr. 3, 1975, now U.S. Pat. No. 3,994,572.

Field of the Invention

The present invention relates to a dual-purpose objective lens system capable of providing focal length variations for zooming purposes and also macrophotographic focusing.

Description of the Prior Art

Generally, commercially acceptable zoom lens systems for cameras and the like are subject to certain limitations upon their focal length range, partly due to the necessity of correcting aberrations and partly due to such present day requirements as the demand for a more compact lens system.

The following arrangements are known to obtain a wider range of focal length variation than the ordinary range of a zoom lens system. In one of these arrangements, an attachment comprising an independent negative lens is provided either forwardly or backwardly of a conventional zoom lens system to achieve the extended focal length. This arrangement, however, requires a mounting device and, hence, a high degree of mechanical precision, and creates a considerable amount of inconvenience in the mounting and dismounting thereof. Another device thus far proposed for the aforementioned purpose is a zoom lens system such as the one disclosed in U.S. Pat. No. 3,912,373. This high speed varifocal objective system includes a pair of lens groups each comprising a variator lens component and a compensator lens component disposed in an optically aligned relationship. Since this prior art system employs two compensator lens components, it is necessary to provide a pair of cam and non-linear groove mechanisms for controlling the relative movement of the compensator lens components. It is obvious that such an arrangement literally doubles the complexity of the zoom lens system as compared to an ordinary zoom lens system, further making it difficult to attain high positional accuracy and, of necessity, making the resultant lens system expensive. Furthermore, since the lens arrangement is such that each of the two lens groups coupled together provide an excess of freedom for the attainment of a desired focal length, a resultant bulky lens system is provided.

The combination of a zooming operation with macrophotography has been suggested in the prior art. For example, U.S. Pat. No. 3,844,555 suggests the forward displacement of a focusing lens with the variator and compensator lenses. Other prior art examples can be found in U.S. Pat. No. 3,655,271, U.S. Pat. No. 3,613,544, U.S. Pat. No. 3,659,921, U.S. Pat. No. 3,784,284 and U.S. Pat. No. 3,784,285.

An economical zooming lens system with an extended focal length range having a macrophotography capability is still a goal of the prior art.

SUMMARY OF THE INVENTION

It is an object of the present invention to obviate the aforementioned disadvantages of the prior art arrangements. It is, accordingly, a primary object to provide a zoom lens system which, although simple in construction, is capable of a wide range of focal length variation and, at the same time, permits macrophotographic focusing.

In accordance with the present invention, the aforementioned object is accomplished by a novel combination of the optical lens system described in our co-pending U.S. patent application Ser. No. 564,817 as filed by us on Apr. 3, 1975, now U.S. Pat. No. 3,994,572 and a conventional zoom lens assembly design.

Our co-pending patent application teaches a varifocal lens system which includes a single movable lens component for varying the focal length of the entire lens system by movement of the movable lens component across a predetermined range of movement. The resultant image plane of an object is continuously shifted from an initial predetermined position at one end of the range of movement towards the object then away from the object to return to its initial predetermined position at the other end of the range of movement. The back focal length of the lens assembly was set so that the image plane of an object at an infinite distance coincided with the design focal plane at either end of the range of movement of the movable lens group. The positioning of the movable lens component intermediate of its range of movement provides a relative movement of the image plane from its initial position towards the object sufficiently to permit the focusing of an object in the macrophotography range. This intermediate shifting of the image plane toward the object side is found to be highly advantageous for macrophotography in that the image plane of an object at a relatively close distance, for example, less than one meter, will begin to coincide with the relatively small depth of focus of the focal plane.

The advantages of our earlier inventive design have been found to be of particular use when a conventional zoom lens is modified so that the master lens group of the zoom lens system comprises the inventive varifocal lens system of our earlier application. The contents of our earlier U.S. Pat. No. 3,994,572 is specifically incorporated herein by reference and made a part of the present application. As can be appreciated, the present inventive design can be utilized with a conventional zoom lens system as the basic unit regardless of whether it is a mechanically compensated zoom lens system or an optically compensated zoom lens system.

The design of conventional zoom lens systems includes a first group having at least one movable lens component for varying the magnification of the first group with the resultant image plane deviation being maintained within the depth of focus throughout the range of variable magnification. A conventional zoom lens system further includes a second group located after the first group for setting the focal length of the over-all zoom lens system with respect to the minimum magnification of the first group. The second lens group is generally referred to as a master lens group.

Assuming that the zoom ratio, i.e., a ratio of the maximum to minimum magnifications, of the first group is, $R_1$, and that the second group sets the focal length of the over-all zoom lens system at, $f$, with respect to the minimum magnification of the first group, the zoom lens system generally provides a range of variable focal length from $f$ to $R_1 \cdot f$. According to the present invention, the second lens group includes the varifocal lens system disclosed in U.S. Pat. No. 3,994,572. Therefore, the second lens group is capable of variably setting the focal length of the over-all zoom lens system with respect to the minimum magnification of the first group. Namely, the second group can set the above mentioned focal length at $f$ when the movable lens component of the second group is located at a first predetermined position in the range of movement. The second group can further set the focal length at $R_2.f$ with the movable lens component located at another second predetermined position in the range, assuming that $R_2$ is a ratio of the maximum to minimum magnifications of the second group by itself.

The final image plane will be located at the same position when the movable lens component of the second group is at one of the predetermined positions and also at the other end of the predetermined positions. Accordingly, the zoom lens system has a first range of variable focal length from $f$ to $R_1.f$ with the movable lens component of the second group located at one of the predetermined positions and a second range of variable focal length from $R_2.f$ to $R_1.R_2.f$ with the movable lens component of the second group located at the other of the predetermined positions. The first range can be joined to the second range if $R_1 > R_2$. Thus, a zoom lens system can be provided with a continuous range of variable focal length from $f$ to $R_1.R_2.f$ and can be identified as a wide range zoom lens system with a zoom ratio of $R_1.R_2$.

For example, if $f = 20_{mm}$, $R_1 = 4$, and $R_2 = 2$, the first range will cover from $20_{mm}$ to $80_{mm}$, while the second range will cover from $40_{mm}$ to $160_{mm}$. Accordingly, the resulting zoom lens system can provide a continuous range covering from $20_{mm}$ to $160_{mm}$ with a resulting zoom ratio of 8.

Since the inventive varifocal lens system is used as the master lens group it can further provide an exaggerated image plane deviation when the movable lens component is set in an intermediate position other than the above mentioned predetermined positions to permit macrophotographic focusing.

The present invention both to its organization and manner of operation, together with further objects and advantages thereof, may best be understood by reference to the following description, taken in connection with the accompanying drawings and claims.

BRIEF DESCRIPTION OF THE DRAWINGS

FIGS. 1-A, 1-B, 1-C, 1-D, 2-A, 2-B, 2-C and 2-D are schematic views illustrating a first embodiment of the present invention as an equivalent thin lens system;

FIGS. 5-A, 5-B, 5-C, 5-D, 6-A, 6-B, 6-C and 6-D are schematic views showing a second embodiment of the invention as an equivalent thin lens system;

FIGS. 10-A, 10-B, 10-C and 10-D are various aberration curves for the example illustrated in FIG. 9.

BRIEF DESCRIPTION OF THE PREFERRED EMBODIMENT

The following description is provided to enable any person skilled in the optical art to make and use the invention and sets forth the best mode contemplated by the inventors of carrying out their invention. Various modifications, however, will remain readily apparent to those skilled in the art, since the generic principles of the present invention have been defined herein specifically to provide a zoom lens system with macrophotography capability that can be manufactured in a relatively economical manner.

The derivation of the lens parameters set forth herein can be accomplished with the assistance of a computer. The present invention represents the parameters of a compromised balance of acceptable aberrations in a relatively easily manufactured and low cost lens system for utilization, for example, with a camera.

When referring herein to a lens component, it is to be understood, both in the specification and the claims that the term "lens" is intended to be interpreted broadly enough to cover either a single lens element or an equivalent comprising a group of two or more lens elements or even a doublet.

In the accompanying drawings which supplement the following tables, the lenses in accordance with the present invention, are illustrated diagrammatically using reference characters. As usual, in conventional lens diagrams, the light is assumed to travel from left to right, the individual lenses can be designated by the letter, G, with a subscript indicating the number of the lens as numbered consecutively from object to image side. Any diaphragms in the figures are indicated by the letter, S. The radii of curvature of the lenses are indicated in the tables by, $r$, with a subscript corresponding to the consecutive surfaces of the lens elements.

In the tables, the minus signs indicate surfaces concave toward the object side, while the surfaces without a sign are convex toward the object side. The tables also disclose the axial spacings, $d$, along the optical axis and include both the axial spacings between the lens elements and thickness of the lens elements. The axial spacings between the lens elements are positioned accordingly relative to the radii of the tables while the thicknesses are designated accordingly between the radii. All linear dimensions are given in absolute values and are given with reference to the equivalent focal length of unity.

Figure 1:
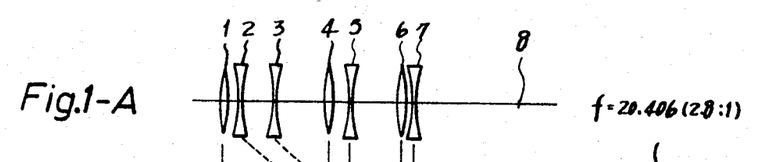

Hereinafter the embodiments of the present invention will be described with reference to the accompanying drawings. FIGS. 1-A, 1-B, 1-C and 1-D pertain to a first equivalent thin lens embodiment of the invention with movable components located at various positions, respectively. The over-all focal length of each lens component and the axial distance between the components, as illustrated in the thin lens system, are set forth hereinafter in Table 1. Referring to FIG. 1-A, reference numerals 1, 2, 3 and 4 indicate lens components which, taken together, constitute an afocal mechanically compensated zoom lens system in a first lens group I. Reference numeral 1 refers to a normally stationary first, front lens component having a positive over-all refractivity; 2 refers to a movable, negatively refracting second, variator lens component; 3 refers to a movable, negatively refracting third, compensator lens component; and 4 is a positively refracting stationary fourth, relay lens component for making the entire first lens group I afocal. A second lens group II corresponds to the master lens group of a conventional zoom lens. In group II, 5, 6 and 7, taken together, represent a varifocal lens system such as the one previously described in our U.S. Pat. No. 3,994,572. Thus, reference numeral 5 is a normally stationary fifth lens component having a negative over-all refractive power, 6 is a sixth lens component movable independently of lens components 2 and 3, and reference numeral 7 is a seventh lens component having a negative over-all refractive power. The focal plane is indicated on the optical axis by numeral 8. The following focal lengths and axial distances describe the first embodiment of the present invention.

Table I

| Focal length for lens components | Axial distance between lens components | | | |
|---|---|---|---|---|
| | 1 - A | 1 - B | 1 - C | 1 - D |
| $F_1 = +64.565$ | | | | |
| | 9.501 ~ | 34.501 | 9.501 ~ | 34.501 |
| $F_2 = -27.286$ | | | | |
| | 17.942 ~ | 18.5 | 17.942 ~ | 18.5 |
| $F_3 = -80.137$ | | | | |
| | 33.46 ~ | 7.902 | 33.46 ~ | 7.902 |
| $F_4 = +71.734$ | | | | |
| | 12.0 — | 12.0 | 12.0 — | 12.0 |
| $F_5 = -40.284$ | | | | |
| | 28.0 — | 28.0 | 8.0 — | 8.0 |
| $F_6 = +28.284$ | | | | |
| | 4.5 — | 4.5 | 24.5 — | 24.5 |
| $F_7 = -126.217$ | | | | |
| All-over focal length for whole lens system | 20.406 ~ | 78.436 | 41.003 ~ | 156.87 |

Figure 2:
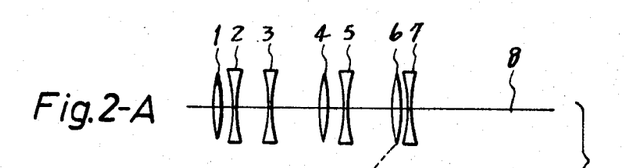

Still referring to the combined FIGS. 1 and 2, the second lens group II has a fifth and sixth lens component, which taken together, constitute a two-component optically compensated varifocal zoom lens system. Thus, assuming that the focal lengths of the fifth and sixth lens components are $F_5$ and $F_6$, respectively, the ratio of the maximum to minimum over-all magnifications of the combined fifth and sixth lens components is R, the length of the range movement of the sixth lens component is Z, and the minimum axial distance between the fifth and the sixth components, represented by thin lenses, $d \cdot Z$, where in $d$ corresponds to the minimal axial distance between the fifth and sixth components represented by equivalent thin lenses when Z is normalized to a value of 1. The present zoom lens system is designed so that it satisfies the following equations:

$$F_5 = \left( \frac{-1}{\sqrt{R} - 1} + d \right) \cdot Z \quad (1)$$

$$F_6 = \frac{\sqrt{R}}{R - 1} \cdot Z \quad (2)$$

By adhering to the above equations (1) and (2) the position of the image plane provided by the zoom lens system will be the same for a given object at the two extremities of the stroke of the sixth lens component. In addition, the zoom lens system is further designed so that the image plane deviation at any intermediate position within the stroke of the sixth lens component will occur on the object side and that the degree of such deviation will be of a sufficient magnitude to cause the image plane of an object extremely close to the camera to coincide with the focal plane 8. The actual extent of focal plane deviation is governed by the values of $d$ and $z$.

FIGS. 1-A and 1-B represent the cases in which the sixth movable lens component of the second lens group II is held stationary at the maximum wide-angle position of its range of movement and the zoom lens system of the first group I (1, 2, 3 and 4 in FIG. 1) is shifted from a maximum wide-angle position (FIG. 1-A) to a maximum telephoto position (FIG. 1-B). The broken lines depicted between FIG. 1-A and FIG. 1-B represent the actual shifting movement of the lens components. In this particular example, the focal length of the entire lens system is variable from 20.406 mm to 78.436 mm, the zoom ration being about 4.

FIGS. 1-C and 1-D illustrate the case in which the sixth movable lens component of the second lens group II is held stationary in the maximum telephoto position, the zoom lens system of the first lens group I being shifted from the maximum wide-angle position (FIG. 1-C) to the maximum telephoto position (FIG. 1-D) similar to the case depicted in FIGS. 1-A and 1-B. In this example, the focal length of the entire system is variable from 41.003 mm to 156.87 mm, the varifocal ratio being again about 4.

As mentioned above, a zoom lens system according to this embodiment is such that with the sixth movable lens component in the second lens group II being held stationary either in the maximum wide-angle position or in the maximum telephoto position, the over-all varifocal range includes an overlapping range from 41.003 mm to 78.436 mm between the case depicted in FIGS. 1-A and 1-B and the case illustrated in FIGS. 1-C and 1-D so that a continuous variation from 20.406 mm through 156.87 mm can be accomplished without interruption. As a result, the zoom lens system of the present embodiment can provide a zoom ratio of about 8 without a loss of focus.

Figure 3:
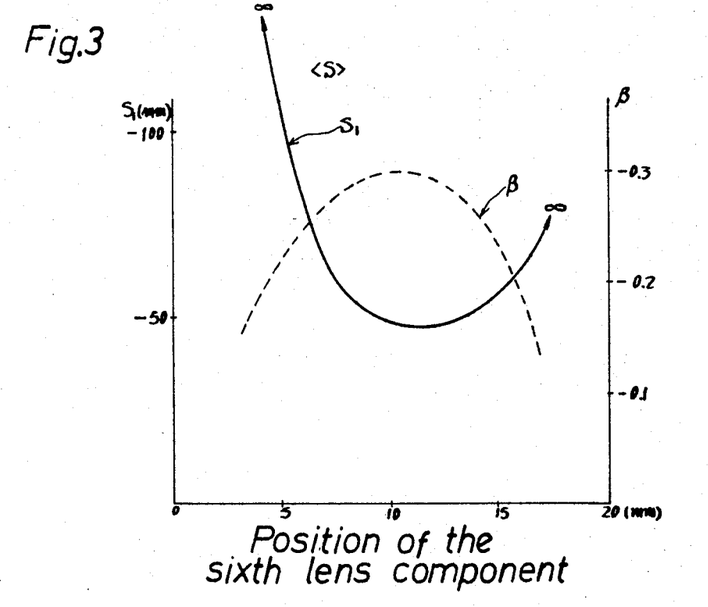
FIGS. 3 and 4 are diagrams illustrating the macrophotographic function of the first embodiment of the present invention.
Figure 4:
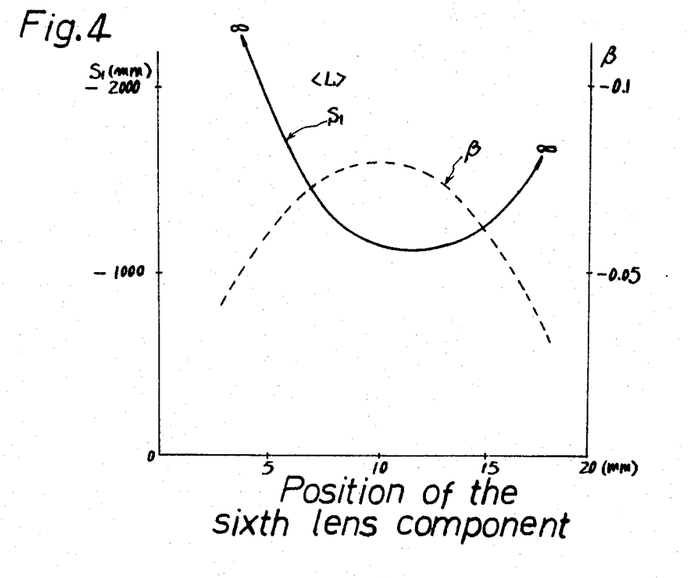

FIGS. 2-A, 2-B, 2-C and 2-D disclose the macrophotographic capability of the present invention. FIGS. 2-A to 2-D illustrate the zoom lens system of the first embodiment in a macrophotographic mode with the first lens group I being held stationary either in the maximum wide-angle position or in the maximum telephoto position. The variation in the distance from the lens system to an object in focus and the magnification which can be obtained upon shifting of the sixth lens component of second lens group II, indicated by broken lines, are shown in FIGS. 3 and 4, repectively. FIG. 3 shows the change in the distance of the object in focus $S_1$ and the lateral magnification, $\beta$, that are obtainable upon shifting of the sixth lens component from the position of FIG. 2-A to that of FIG. 2-B. FIG. 4 shows the change in distance, $S_1$, and lateral magnification, $\beta$, in response to the shift of the sixth lens component from the position illustrated in FIG. 2-C to that of FIG. 2-D. FIGS. 3 and 4 pertain to the cases in which $S_1 = \infty$ and the sixth lens component is located at either extremity of its stroke. As can be appreciated, the macrophotography range exists in the intermediate stroke between the two positions shown, for example, in FIGS. 2-C and FIG. 2-D.

The maximum lateral magnification for the case represented in FIG. 3 is approximately 0.3, the corresponding distance of the object, $S_1$, being about 50 mm. The maximum $\beta$ value for the case of FIG. 4 is about 0.08, the distance $S_1$ being about 1.1 m. It should, of course, be understood that if the lens shifting is accomplished by operating the focusing means, the $S_1$ curve is usually shifted further downwards than shown on the graph.

Figure 5:
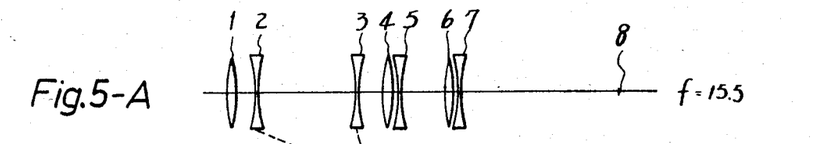
Figure 7:
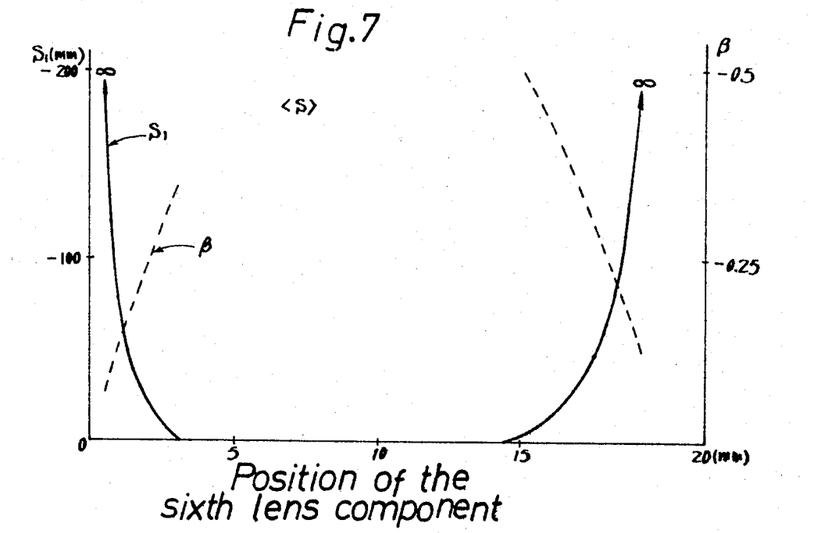
FIGS. 7 and 8 are diagrams illustrating the macrophotographic function of the second embodiment of the present invention.
Figure 8:
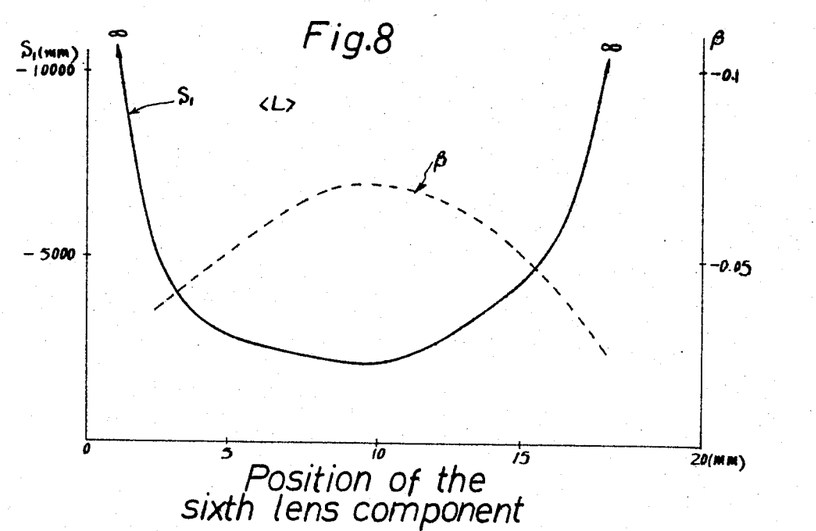

FIGS. 5-A through FIG. 8 show another embodiment of the present invention. The lens components 1 to 7 in FIGS. 5-A to 6-D, inclusive, have the same functions as the corresponding lens components designated by like numerals in FIGS. 1-A to 2-D. FIGS. 5-A and 5-B illustrate the lens positions similar to FIGS. 1-A and 1-B, the sixth lens component being held stationary in a maximum wide-angle position; FIGS. 5-C and 5-D show the situation where, as in FIGS. 1-C and 1-D, the sixth lens component is held stationary in a maximum telephoto position. The over-all focal lengths and axial distances of the individual lens components, which are illustrated as a thin lens system, FIGS. 5-A to 6-D are set forth below in Table 2.

It is apparent from Table 2 that the first lens group of the second embodiment illustrated in FIGS. 5-A to 5-D has a zoom ratio of about 10, with the zoom ratio provided by the second lens group II being about 2. This means that the second embodiment provides an over-all zoom ratio of about 20 covering a range of 15.5 mm to 296.319 mm.

Figure 6:
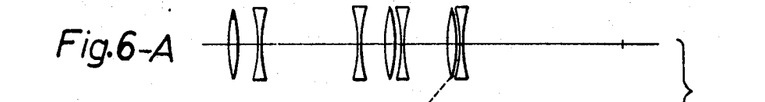

Referring to FIGS. 6-A to 6-D the second embodiment is disclosed as the sixth movable lens passes through the macrophotographic range. FIGS. 6-A and 6-B disclose the lens positions with the first lens group I held stationary in the maximum wide-angle position, while FIGS. 6-C and 6-D correspond to the situation where the same lens group is held stationary in the maximum telephoto position.

FIG. 7 shows the relative changes in distance, $S_1$, and the lateral magnification, $\beta$, upon the shifting of the sixth lens component from the position of FIG. 6-A to that of FIG. 6-B. In this instance, the lateral magnification is 0.34 and the distance of the object $S_1$ is 3.8 mm. The changes in distance $S_1$ and lateral magnification $\beta$ upon the shifting of the sixth lens component from the position of FIG. 6-C to that of FIG. 6-D are shown in FIG. 8. In that instance, the maximum magnification is 0.07 at a distance of $S_1 = 2.23$ m. Referring to both FIG. 7 and FIG. 8, $S_1 = \infty$ when the sixth lens component is located at either end of its stroke. The respective focal lengths and axial distances are set forth as follows.

Table 2

| Focal length for lens components | Axial distance between lens components | | | | | | |
|---|---|---|---|---|---|---|---|
| | 5 - A | | 5 - B | 5 - C | | 5 - D | |
| $F_1 = +86.076$ | | | | | | | |
| | 14.0 | ~ | 62.0 | 14.0 | ~ | 62.0 | |
| $F_2 = -20.688$ | | | | | | | |
| | 55.308 | ~ | 13.038 | 55.308 | ~ | 13.038 | |
| $F_3 = -44.709$ | | | | | | | |
| | 15.73 | ~ | 10.0 | 15.73 | ~ | 10.0 | |
| $F_4 = +44.948$ | | | | | | | |
| | 6.5 | — | 6.5 | 6.5 | — | 6.5 | |
| $F_5 = -40.284$ | | | | | | | |
| | 28.0 | — | 28.0 | 4.5 | — | 4.5 | |
| $F_6 = +28.284$ | | | | | | | |
| | 4.5 | — | 4.5 | 28.0 | — | 28.0 | |
| $F_7 = -86.007$ | | | | | | | |
| All-over focal length for whole lens system | 15.5 | ~ | 148.158 | 31.0 | ~ | 296.319 | |

Focusing, in the present invention for ordinary photographic distances, may be accomplished by shifting the fifth lens component 5, as well as by shifting the first front lens component 1.

Since the specific lens parameters are provided herein to meet the requirements of a full disclosure adequate to convey the present invention to a lens designer, it should not be construed as limiting the invention to the specific lens as set forth below in Table 3.

Table 3

$f = 20.406$   78.436   F No. = 2.8
$f = 41.003$   156.87   F No. = 5.0   Field Angle 2 = 5.8° 45.6°

| | Radius of Curvature | Axial Distance | | Refractive Index/ Abbe's Number |
|---|---|---|---|---|
| $G_1$ | $r_1$ 93.271<br>$r_2$ 44.793 | $d_1$ | 2.2 | $N_1/V_1$ 1.80518/25.43 |
| $G_2$ | $r_3$ 45.317<br>$r_4$ 687.219 | $d_2$<br>$d_3$ | 0.38<br>7.2 | $N_2/V_2$ 1.62135/61.28 |
| $G_3$ | $r_5$ 39.723<br>$r_6$ 168.499 | $d_4$<br>$d_5$ | 0.1<br>6.5 | $N_3/V_3$ 1.62135/61.28 |
| $G_4$ | $r_7$ 305.594<br>$r_8$ 16.887 | $d_6$<br>$d_7$ | variable<br>1.35 | $N_4/V_4$ 1.62135/61.28 |
| $G_5$<br>$G_6$ | $r_9$ 622.568<br>$r_{10}$ 17.387<br>$r_{11}$ 47.531 | $d_8$<br>$d_9$<br>$d_{10}$ | 4.853<br>1.0<br>4.0 | $N_5/V_5$ 1.5168/64.04<br>$N_6/V_6$ 1.76182/26.55 |
| $G_7$ | $r_{12}$ −34.827<br>$r_{13}$ 1194.443 | $d_{11}$<br>$d_{12}$ | variable<br>1.0 | $N_7/V_7$ 1.62135/61.28 |
| $G_8$ | $r_{14}$ 69.686<br>$r_{15}$ 196.063 | $d_{13}$<br>$d_{14}$ | 0.992<br>1.5 | $N_8/V_8$ 1.62135/61.28 |
| | Aperture Stop | $d_{15}$ | variable | |
| $G_9$ | $r_{16}$ 71.726<br>$r_{17}$ −41.897 | $d_s$<br>$d_{16}$ | 2.608<br>3.5 | $N_9/V_9$ 1.66892/45.01 |
| $G_{10}$ | $r_{18}$ −30.580<br>$r_{19}$ −61.979 | $d_{17}$<br>$d_{18}$ | 0.554<br>1.005 | $N_{10}/V_{10}$ 1.74 /37.53 |
| $G_{11}$ | $r_{20}$ 104.099<br>$r_{21}$ 122.615 | $d_{19}$<br>$d_{20}$ | 0.2<br>2.0 | $N_{11}/V_{11}$ 1.5168/64.04 |
| $G_{12}$ | $r_{22}$ 106.463<br>$r_{23}$ 53.668 | $d_{21}$<br>$d_{22}$ | 1.072<br>1.0 | $N_{12}/V_{12}$ 1.74 /28.28 |
| $G_{13}$ | $r_{24}$ −102.225<br>$r_{25}$ 77.932 | $d_{23}$<br>$d_{24}$ | 2.501<br>1.0 | $N_{13}/V_{13}$ 1.805 /40.97 |
| $G_{14}$ | $r_{26}$ 30.978<br>$r_{27}$ 31.935 | $d_{25}$<br>$d_{26}$<br>$d_{27}$ | 0.35<br>1.815<br>variable | $N_{14}/V_{14}$ 1.6 /64.38 |

Table 3-continued

| | | | | Refractive Index/ |
|---|---|---|---|---|
| Radius of Curvature | | Axial Distance | | Abbe's Number |

$f = 20.406$  78.436  F No. = 2.8
$f = 41.003$  156.87  F No. = 5.0  Field Angle $2\omega = 5.8° \sim 45.6°$

| Radius of Curvature | Axial Distance | Refractive Index/Abbe's Number |
|---|---|---|
| $r_{28}$ −177.586 | $d_{28}$ 4.0 | $N_{15}/V_{15}$ 1.62041/60.29 |
| $G_{15}$ −30.959 | $d_{29}$ 1.008 | $N_{16}/V_{16}$ 1.80518/25.41 |
| −36.235 | | |
| $r_{29}$ | | |
| $G_{16}$ | | |
| $r_{30}$ | $d_{30}$ 0.098 | |
| $r_{31}$ 44.514 | $d_{31}$ 4.536 | $N_{17}/V_{17}$ 1.6/64.38 |
| $G_{17}$ −64.713 | | |
| $r_{32}$ | $d_{32}$ variable | |
| $r_{33}$ −53.602 | $d_{33}$ 3.0 | $N_{18}/V_{18}$ 1.56883/55.99 |
| $G_{18}$ −37.462 | | |
| $r_{34}$ | $d_{34}$ 0.563 | |
| $r_{35}$ −33.731 | $d_{35}$ 1.5 | $N_{19}/V_{19}$ 1.76182/26.55 |
| $G_{19}$ −60.904 | | |
| $r_{36}$ | $d_{36}$ 0.132 | |
| $r_{37}$ 103.275 | $d_{37}$ 1.001 | $N_{20}/V_{20}$ 1.6/64.38 |
| $G_{20}$ 70.860 | | |
| $r_{38}$ | | |

The axial distances represented as "variable" in the above Table 3 are subject to change according to the required lens positioning during zooming and macrofocusing as indicated below in Table 4. The movable sixth lens in the schematic of FIG. 9 includes the individual lens elements $G_{15}$, $G_{16}$, and $G_{17}$.

The axial distances $d_{27}$ and $d_{32}$ will be fixed or held constant during a wide-angle or zoom operation, however, during macrophotography the respective axial distances will be varied until the desired range is in focus.

It should be noted that 1-A, 1-B, 1-C and 1-D in Table 4 correspond to 1-A, 1-B, 1-C and 1-D, respectively, in Table 1.

Table 4

| Variable Axial Distance | 1 - A | 1 - B | 1 - C | 1 - D |
|---|---|---|---|---|
| $d_6$ | 0.903 ~ | 25.903 | 0.903 ~ | 25.903 |
| $d_{11}$ | 12.219 ~ | 12.777 | 12.219 ~ | 12.777 |
| $d_{15}$ | 27.437 ~ | 1.879 | 27.437 ~ | 1.879 |
| $d_{27}$ | 22.370 — | 22.370 | 2.370 — | 2.370 |
| $d_{32}$ | 2.831 — | 2.831 | 22.831 — | 22.831 |
| All-over focal length for whole lens system | 20.406 ~ | 78.436 | 41.003 ~ | 156.87 |

Figure 9:
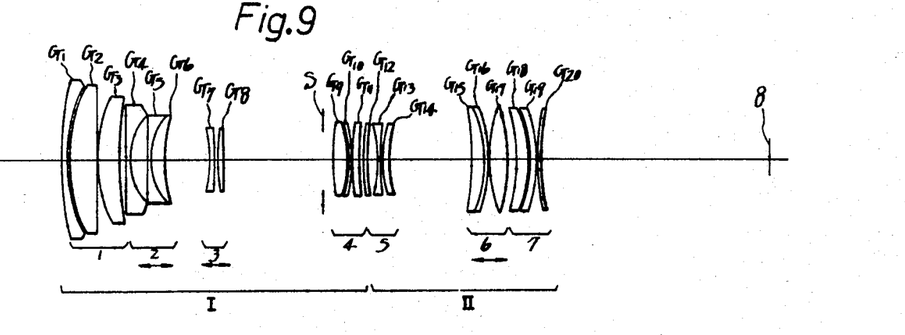
FIG. 9 is a schematic view showing a detailed schematic example of the first embodiment.
Figure 10:
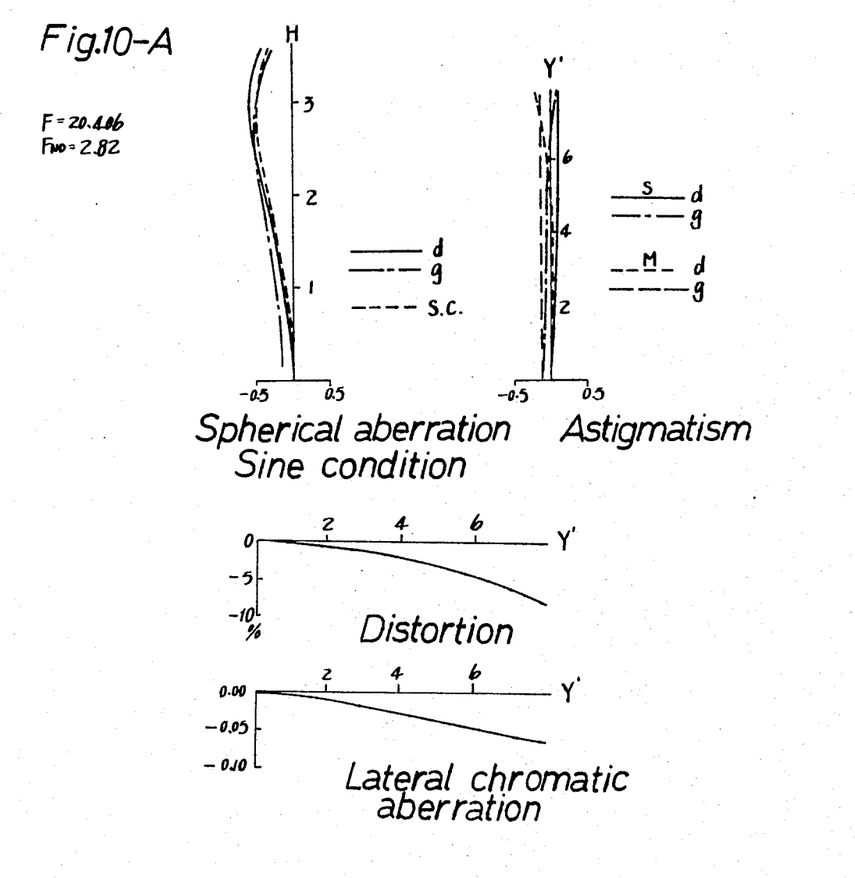

FIG. 9 is a diagrammatic view showing an arrangement of lenses according to Table 3 and Table 4. The lens system is disclosed at its maximum wide-angle position. As can be seen from FIG. 9, $G_1$, $G_2$ and $G_3$ constitute a first lens component which is normally stationary, and $G_4$, $G_5$, $G_6$ and $G_7$, $G_8$ are a second and a third lens component, respectively, both components being movable. The second and third lens components function as a variator and a compensator, respectively, $G_9$, $G_{10}$ and $G_{11}$, taken together, represent a stationary fourth lens component for setting the first lens group I to be afocal and $G_{12}$, $G_{13}$ and $G_{14}$ constitute a normally stationary fifth lens component in a second lens group II which is a two-component optically compensated zoom lens system. $G_{15}$, $G_{16}$ and $G_{17}$, taken together, represent a movable sixth lens component which serves as an element for varying the focal length of the second lens group II and is also of use for macrophotography. $G_{18}$, $G_{19}$ and $G_{20}$ represent a stationary seventh lens component. FIGS. 10-A, 10-B, 10-C and 10-D show, respectively, the spherical aberration, astigmatism, distortion and chromatic aberration for conditions in Table 4 at 1-A, 1-B, 1-C and 1-D, respectively. It will be seen that $F_{NO} = 2.8$ is provided in the range of $f = 20.406$ to 78.436 and $F_{NO} = 5.0$ in the range of $f = 41.003$ to 156.87.

The graphical presentation of the aberrations at selected lens positions across the operative range of the present invention provides ample support for the advantages of the present invention and further support for the claims set forth herein.

Thus, as can be appreciated by an optical designer skilled in this field, the design parameters of the present invention provide an economical lens system capable of replacing a number of heretofore separate prior art lens systems. Various modifications of the present invention can be accomplished herein by a skilled optical designer and accordingly the present invention should be measured solely from the following claims, in which we claim:

What is claimed is:

1. A zoom lens system including a first group having at least one movable lens component for varying the magnification of the first group with an image plane deviation maintained within the depth of focus throughout the range of variable magnification and a second group located after the first group for setting the focal length of the over-all zoom lens system with respect to the minimum magnification of the first group, characterized in that the second group comprises:
    a first lens component; and
    a second lens component movable relatively to the first lens component between a first position for setting the focal length of the over-all zoom lens system with respect to the minimum magnification of the first group at a first value and a second position for setting the above mentioned focal length at a second value greater than the first value, the final image plane formed by the zoom lens system being continuously shifted during the movement of the second lens component from an initial predetermined position with the second lens component at the first position towards the object side and then away from the object side to return to the initial predetermined position with the second lens component at the second position, the relative movement of the image plane from the initial predetermined position towards the object side being beyond the normal depth of focus and sufficient to focus an image of an object in the macrophotography range.

2. The invention of claim 1 wherein the first lens component has a negative refractive power, and the second lens component is located after the first lens component and has a positive refractive power.

3. The invention of claim 2 wherein the focal length $F_1$ for the first lens component and the focal length $F_2$ for the second lens component are determined according to the following equations:

$$F_1 = \left( \frac{-1}{\sqrt{R} - 1} + d \right) \cdot Z$$

$$F_2 = \frac{\sqrt{R}}{R - 1} \cdot Z$$

wherein R is the ratio of the maximum to minimum magnifications of the combined first and second lens components; $d \cdot Z$ is a minimum distance between the first and second lens components represented as equivalent thin lenses, respectively; and Z is the length of range within which the second lens component is movable.

4. The invention of claim 3 wherein the second group further comprises a third lens component located after the second lens component.

5. The invention of claim 3 wherein the first group comprises a front lens component, a variator lens component, which corresponds to at least one movable lens component in the first group, a compensator lens component and a relay lens component.

6. The invention of claim 5 wherein the front lens component is movable for focusing on an object within a normal camera objective distance.

7. The invention of claim 5 wherein the first lens component is movable for focusing on an object within a normal camera objective distance.

8. The invention of claim 3 wherein the first lens component is movable for focusing on an object within a normal camera objective distance.

9. The invention of claim 3 wherein the initial predetermined image plane position is set to coincide with the focal plane with substantial zero deviation.

10. A zoom lens system with macrophotography capability comprising;
means movable along an optical axis for focusing the lens system;
a first optical means movable along the optical axis to vary the focal length of the lens system;
a second optical means also movable along the optical axis to further extend the focal length range of the lens system wherein the total focal length zoom range is a function of the movement of the first and second optical means; and
means for providing macrophotography of an object at a distance closer than the normal zoom range including at least one movable lens component in one of the first and second optical means, the movable lens component having a first position at one end of its range of movement to permit a minimum zoom focal length and a second position at the other end of its range of movement to permit a maximum zoom focal length, the movable lens component having an intermediate position to permit macrophotography of an object at a closer object distance to the lens system than at either the minimum or maximum zoom focal lengths.

11. The invention of claim 10 wherein the image plane deviation for the lens system is substantially zero at the first and second position of the movable lens component with the focusing means set at infinity; the intermediate macrophotography position providing an image deviation beyond a normal depth of focus.

12. The invention of claim 11 wherein the zoom range extends from wide-angle to telephoto.

13. A zoom lens system with macrophotography capability comprising a design parameter of approximate values within the following specification:

| | Radius of Curvature | Axial Distance | Refractive Index/Abbe's Number |
|---|---|---|---|
| $r_1$ | 93.271 | | |
| $G_1$ | | $d_1$ 2.2 | $N_1/V_1$ 1.80518/25.43 |
| $r_2$ | 44.793 | | |
| | | $d_2$ 0.38 | |
| $r_3$ | 45.317 | | |
| $G_2$ | | $d_3$ 7.2 | $N_2/V_2$ 1.62135/61.28 |
| $r_4$ | 687.219 | | |
| | | $d_4$ 0.1 | |
| $r_5$ | 39.723 | | |
| $G_3$ | | $d_5$ 6.5 | $N_3/V_3$ 1.62135/61.28 |
| $r_6$ | 168.499 | | |
| | | $d_6$ variable | |
| $r_7$ | 305.594 | | |
| $G_4$ | | $d_7$ 1.35 | $N_4/V_4$ 1.62135/61.28 |
| $r_8$ | 16.887 | | |
| | | $d_8$ 4.853 | |
| $r_9$ | 622.568 | | |
| $G_5$ | | $d_9$ 1.0 | $N_5/V_5$ 1.5168/64.04 |
| $r_{10}$ | 17.387 | | |
| $G_6$ | | $d_{10}$ 4.0 | $N_6/V_6$ 1.76182/26.55 |
| $r_{11}$ | 47.531 | | |
| | | $d_{11}$ variable | |
| $r_{12}$ | −34.827 | | |
| $G_7$ | | $d_{12}$ 1.0 | $N_7/V_7$ 1.62135/61.28 |
| $r_{13}$ | 1194.443 | | |
| | | $d_{13}$ 0.992 | |
| $r_{14}$ | 69.686 | | |
| $G_8$ | | $d_{14}$ 1.5 | $N_8/V_8$ 1.62135/61.28 |
| $r_{15}$ | 196.063 | | |
| | | $d_{15}$ variable | |
| Aperture Stop | | $d_s$ 2.608 | |
| $r_{16}$ | 71.726 | | |
| $G_9$ | | $d_{16}$ 3.5 | $N_9/V_9$ 1.66892/45.01 |
| $r_{17}$ | −41.897 | | |
| | | $d_{17}$ 0.554 | |
| $r_{18}$ | −30.580 | | |
| $G_{10}$ | | $d_{18}$ 1.005 | $N_{10}/V_{10}$ 1.74/37.53 |
| $r_{19}$ | −61.979 | | |
| | | $d_{19}$ 0.2 | |
| $r_{20}$ | 104.099 | | |
| $G_{11}$ | | $d_{20}$ 2.0 | $N_{11}/V_{11}$ 1.5168/64.04 |
| $r_{21}$ | 122.615 | | |
| | | $d_{21}$ 1.072 | |
| $r_{22}$ | 106.463 | | |
| $G_{12}$ | | $d_{22}$ 1.0 | $N_{12}/V_{12}$ 1.74/28.28 |
| $r_{23}$ | 53.668 | | |
| | | $d_{23}$ 2.501 | |
| $r_{24}$ | −102.225 | | |
| $G_{13}$ | | $d_{24}$ 1.0 | $N_{13}/V_{13}$ 1.805/40.97 |
| $r_{25}$ | 77.932 | | |
| | | $d_{25}$ 0.35 | |
| $r_{26}$ | 30.978 | | |
| $G_{14}$ | | $d_{26}$ 1.815 | $N_{14}/V_{14}$ 1.6/64.38 |
| $r_{27}$ | 31.935 | | |

-continued

| Radius of Curvature | Axial Distance | | Refractive Index/Abbe's Number |
|---|---|---|---|
| | $d_{27}$ | variable | |
| $r_{28}$ −177.586 | | | |
| $G_{15}$ | $d_{28}$ | 4.0 | $N_{15}/V_{15}$ 1.62041/60.29 |
| $r_{29}$ −30.959 | | | |
| $G_{16}$ | $d_{29}$ | 1.008 | $N_{16}/V_{16}$ 1.80518/25.41 |
| $r_{30}$ −36.235 | | | |
| | $d_{30}$ | 0.098 | |
| $r_{31}$ 44.514 | | | |
| $G_{17}$ | $d_{31}$ | 4.536 | $N_{17}/V_{17}$ 1.6/64.38 |
| $r_{32}$ −64.713 | | | |

-continued

| Radius of Curvature | Axial Distance | | Refractive Index/Abbe's Number |
|---|---|---|---|
| | $d_{32}$ | variable | |
| $r_{33}$ −53.602 | | | |
| $G_{18}$ | $d_{33}$ | 3.0 | $N_{18}/V_{18}$ 1.56883/55.99 |
| $r_{34}$ −37.462 | | | |
| | $d_{34}$ | 0.563 | |
| $r_{35}$ −33.731 | | | |
| $G_{19}$ | $d_{35}$ | 1.5 | $N_{19}/V_{19}$ 1.76182/26.55 |
| $r_{36}$ −60.904 | | | |
| | $d_{36}$ | 0.132 | |
| $r_{37}$ 103.275 | | | |
| $G_{20}$ | $d_{37}$ | 1.001 | $N_{20}/V_{20}$ 1.6/64.38 |
| $r_{38}$ 70.860 | | | |

* * * * *